United States Patent
Geraci

(10) Patent No.: US 9,395,875 B2
(45) Date of Patent: Jul. 19, 2016

(54) SYSTEMS, METHODS, AND COMPUTER PROGRAM PRODUCTS FOR NAVIGATING THROUGH A VIRTUAL/AUGMENTED REALITY

(75) Inventor: Chad Anthony Geraci, Austin, TX (US)

(73) Assignee: eBay, Inc., San Jose, CA (US)

( * ) Notice: Subject to any disclaimer, the term of this patent is extended or adjusted under 35 U.S.C. 154(b) by 99 days.

(21) Appl. No.: 13/534,802

(22) Filed: Jun. 27, 2012

(65) Prior Publication Data

US 2014/0006966 A1 Jan. 2, 2014

(51) Int. Cl.
- *G06F 3/0481* (2013.01)
- *G06T 19/00* (2011.01)
- *G06F 3/0346* (2013.01)
- *G06Q 30/02* (2012.01)
- *G06T 17/05* (2011.01)
- *G01C 21/36* (2006.01)

(52) U.S. Cl.
CPC .......... *G06F 3/04815* (2013.01); *G01C 21/362* (2013.01); *G06F 3/0346* (2013.01); *G06Q 30/02* (2013.01); *G06Q 30/0259* (2013.01); *G06Q 30/0261* (2013.01); *G06T 17/05* (2013.01); *G06T 19/003* (2013.01); *G06T 19/006* (2013.01)

(58) Field of Classification Search
CPC .............................. G06F 3/048; G06F 3/04815
USPC ......................................................... 715/748
See application file for complete search history.

(56) References Cited

U.S. PATENT DOCUMENTS

| | | | |
|---|---|---|---|
| 7,626,596 B2 * | 12/2009 | Kotake | G06T 15/205 345/632 |
| 8,666,815 B1 * | 3/2014 | Chau | 705/14.63 |
| 2004/0066305 A1 * | 4/2004 | Rubenstein | 340/692 |
| 2007/0162942 A1 * | 7/2007 | Hamynen et al. | 725/105 |
| 2007/0273558 A1 * | 11/2007 | Smith | G08G 1/0962 340/995.1 |
| 2009/0012865 A1 * | 1/2009 | Celik | 705/14 |
| 2009/0143980 A1 * | 6/2009 | Halters et al. | 701/209 |
| 2009/0271369 A1 * | 10/2009 | Cheng et al. | 707/3 |
| 2009/0281724 A1 * | 11/2009 | Blumenberg et al. | 701/208 |
| 2010/0004995 A1 * | 1/2010 | Hickman | G06Q 30/02 705/14.58 |

(Continued)

OTHER PUBLICATIONS

Artinger et al., "Exploring Multi-touch Gestures for Map INteraction in Mass Casualty Incidents", published Oct. 7, 2011.*

(Continued)

*Primary Examiner* — Reza Nabi
*Assistant Examiner* — Daniel Rodriguez
(74) *Attorney, Agent, or Firm* — Haynes & Boone, LLP

(57) ABSTRACT

The present disclosure provides an exemplary system, method, and computer program product. The exemplary method includes communicating with a provider of digital content to request data regarding a specific item of interest using a mobile device associated with a user. The method further includes receiving the requested data regarding the specific item of interest from the provider of digital content on the mobile device. The method further includes rendering the received data regarding the specific item of interest on a display of the mobile device, the rendering including superimposing the received data on a street view. The method further includes navigating through the street view according to navigation functions of the mobile device to locate a physical commercial location that carries the specific item of interest.

20 Claims, 6 Drawing Sheets

(56) References Cited

U.S. PATENT DOCUMENTS

| | | | |
|---|---|---|---|
| 2010/0030469 A1* | 2/2010 | Hwang | G01C 21/36 701/533 |
| 2010/0088061 A1* | 4/2010 | Horodezky et al. | 702/141 |
| 2010/0123737 A1* | 5/2010 | Williamson et al. | 345/672 |
| 2010/0188503 A1* | 7/2010 | Tsai et al. | 348/142 |
| 2011/0106595 A1* | 5/2011 | Vande Velde | G06Q 30/02 705/14.4 |
| 2011/0141141 A1* | 6/2011 | Kankainen | G01C 21/3647 345/632 |
| 2011/0141254 A1* | 6/2011 | Roebke | G06F 17/30041 348/61 |
| 2011/0173576 A1* | 7/2011 | Murphy | G06F 3/0481 715/863 |
| 2011/0187744 A1* | 8/2011 | Kim | A63F 13/12 345/633 |
| 2011/0196610 A1* | 8/2011 | Waldman et al. | 701/209 |
| 2011/0237254 A1* | 9/2011 | Lee | H04N 21/234 455/435.2 |
| 2011/0279446 A1* | 11/2011 | Castro | G01C 21/02 345/419 |
| 2011/0302527 A1* | 12/2011 | Chen et al. | 715/800 |
| 2012/0032974 A1* | 2/2012 | Lynch | 345/619 |
| 2012/0050317 A1* | 3/2012 | Lee et al. | 345/619 |
| 2012/0086728 A1* | 4/2012 | McArdle et al. | G06F 3/017 345/633 |
| 2012/0105475 A1* | 5/2012 | Tseng | 345/633 |
| 2012/0154443 A1* | 6/2012 | Matsui | H04B 10/1121 345/634 |
| 2012/0212405 A1* | 8/2012 | Newhouse | G02B 27/017 345/156 |
| 2012/0212406 A1* | 8/2012 | Osterhout et al. | 345/156 |
| 2012/0246003 A1* | 9/2012 | Hart | G06Q 30/0241 705/14.57 |
| 2013/0116922 A1* | 5/2013 | Cai | G01C 21/206 701/515 |
| 2013/0138534 A1* | 5/2013 | Herwig | 705/26.62 |
| 2013/0178257 A1* | 7/2013 | Langseth | G06T 17/05 463/4 |
| 2013/0222369 A1* | 8/2013 | Huston | G06T 17/00 345/419 |
| 2013/0231861 A1* | 9/2013 | Yokoyama | G01C 21/3647 701/523 |
| 2013/0311909 A1* | 11/2013 | Howard et al. | 715/760 |
| 2013/0314398 A1* | 11/2013 | Coates | G09G 5/14 345/419 |
| 2014/0156459 A1* | 6/2014 | Zises | G06Q 30/0623 705/26.61 |
| 2014/0321698 A1* | 10/2014 | Chao | G06T 7/0018 382/103 |
| 2015/0178777 A1* | 6/2015 | Jing | G06Q 30/0259 705/14.57 |

OTHER PUBLICATIONS

51degrees, "Instructions", published Feb. 5, 2011, http://51degrees.mobi/Support/Tutorials/Maps.aspx.*

VCgate.com, "Do You Have Trouble Finding Things in Stock at Your Local Store? Introducing Milo, the Merchandise Search Engine", published Jul. 27, 2009, http://www.vcgate.com/2009/07/27/do-you-have-trouble-finding-things-in-stock-at-your-local-stores-introducing-milo-the-merchandise-search-engine/.*

51Degrees, "Instructions", Feb. 15, 2011, http://51degrees.mobi/Support/Tutorials/Maps.aspx.*

51Degrees, "Instructions", available at <http://51degrees.mobi/Support/Tutorials/Maps.aspx>, archived on Feb. 15, 2011 at wayback machine <http://web.archived.org>, 4 pages.*

Nate Nead, "Google StreetView Advertising", available at <http://blog.digitalsignage.com/google-streetview-advertising/>, posted on Jul. 5, 2011, 1 page.*

* cited by examiner

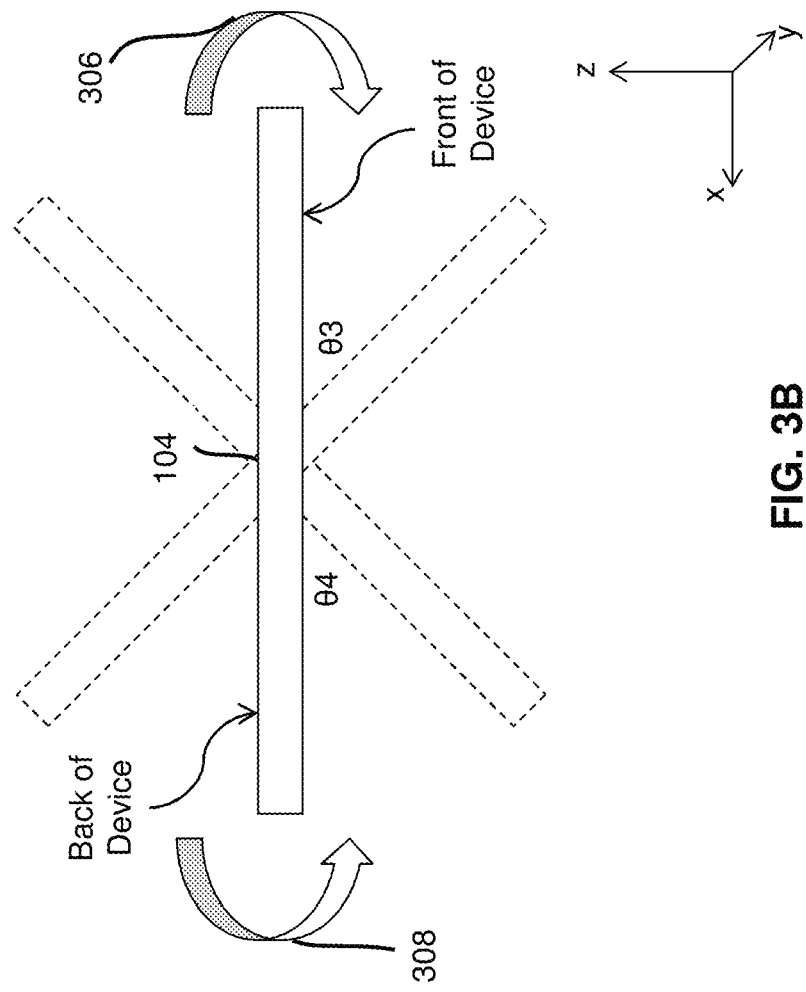
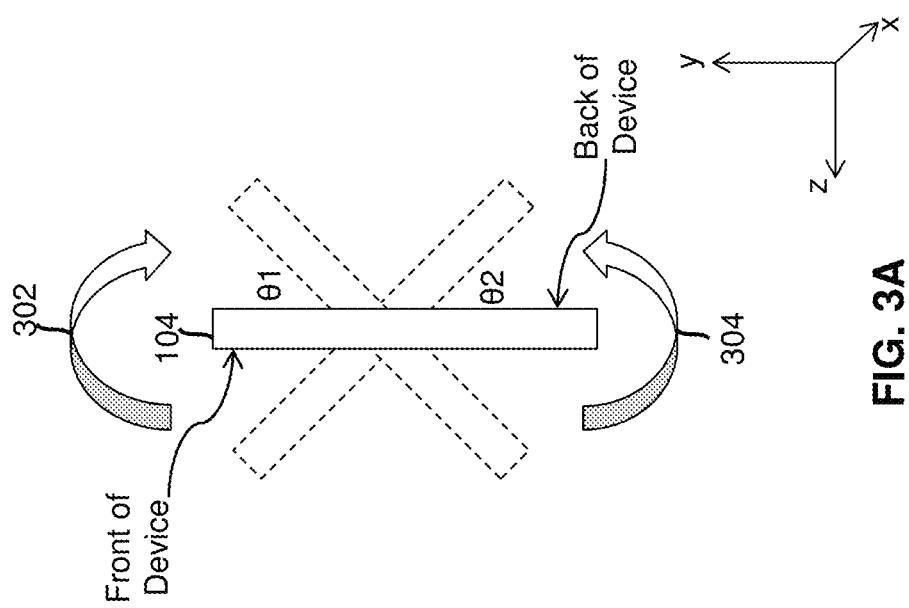
FIG. 3B
FIG. 3A

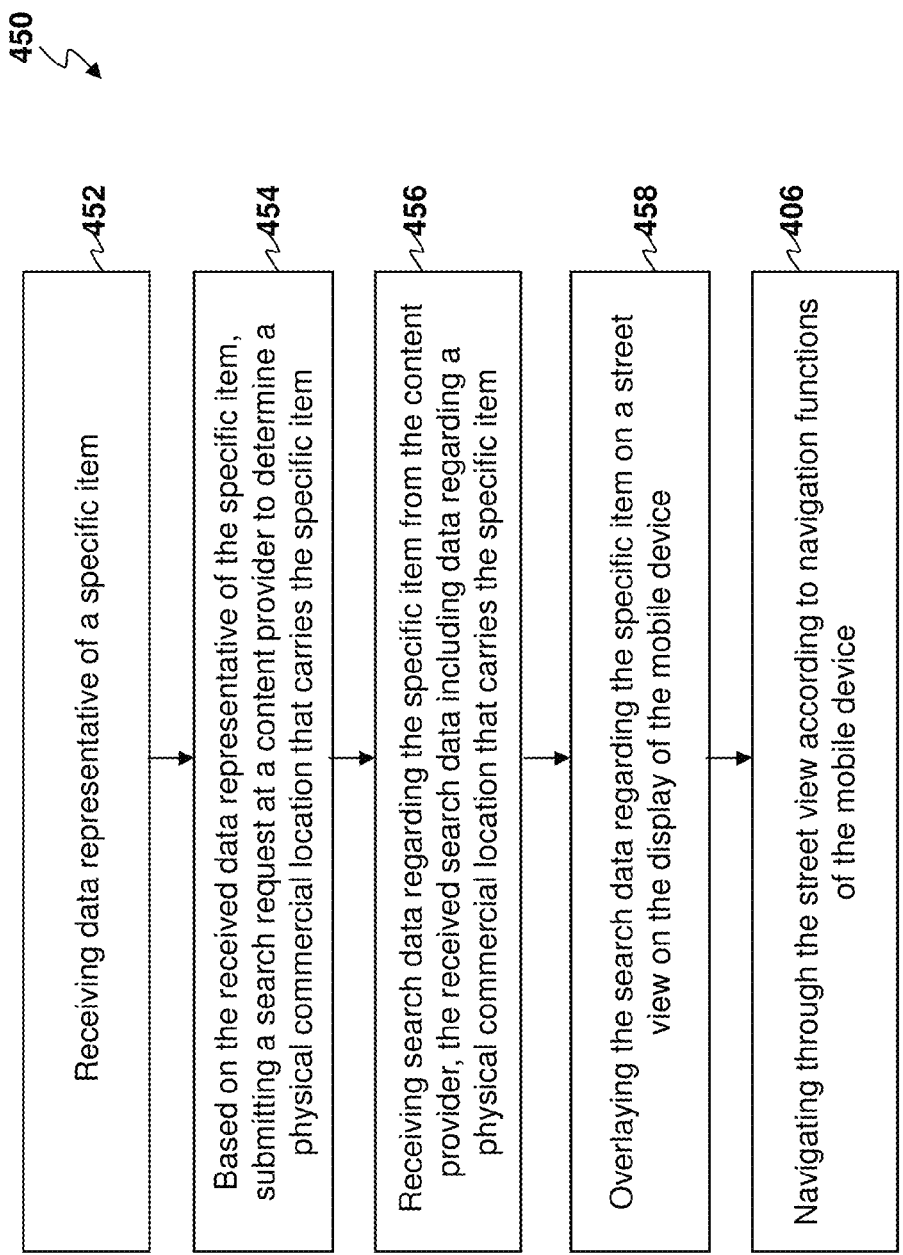

SYSTEMS, METHODS, AND COMPUTER PROGRAM PRODUCTS FOR NAVIGATING THROUGH A VIRTUAL/AUGMENTED REALITY

BACKGROUND

1. Technical Field

The present disclosure generally relates to navigating through a virtual or augmented reality and, more particularly, to utilizing a mobile device to navigate through a virtual or augmented reality street view that has search results layered over the display.

2. Related Art

Online transactions are becoming more and more prevalent, with an ever-increasing number of online entities that may or may not have a physical real world counterpart. The popularity of online transactions is partially attributable to the ease and convenience of making a transaction online instead of at a physical commercial location.

In addition to the on-line channel of commerce, mobile electronic communication devices and applications have been developed that are specifically aimed at commerce as well. As some non-limiting examples, these mobile devices may include smart phones, computer tablets, or laptops. Many of these mobile devices have increased capabilities as they have been equipped with, among other hardware devices, a Global Positioning System (GPS), a compass, a digital camera. These capabilities of the mobile devices have not, however, been fully utilized to create a better shopping experience for their users who may be shopping at physical commercial locations.

Therefore, while existing mobile devices and their applications have been generally adequate at performing their intended tasks, their fully capabilities have not been utilized in certain aspects. Accordingly, it would be advantageous to utilize capabilities of mobile devices to improve the shopping experience for users of the mobile device that are shopping at a physical commercial location by making the shopping experience easier and more convenient.

BRIEF DESCRIPTION OF THE DRAWINGS

FIG. 3A is an illustration of a side view of a mobile device, according to various aspects of the present disclosure.

FIG. 3B is an illustration of a top view of a mobile device, according to various aspects of the present disclosure.

FIG. 4B is an illustration of an example method, which may be performed by an application on a mobile device, according to various aspects of the present disclosure.

DETAILED DESCRIPTION

Figure 1:
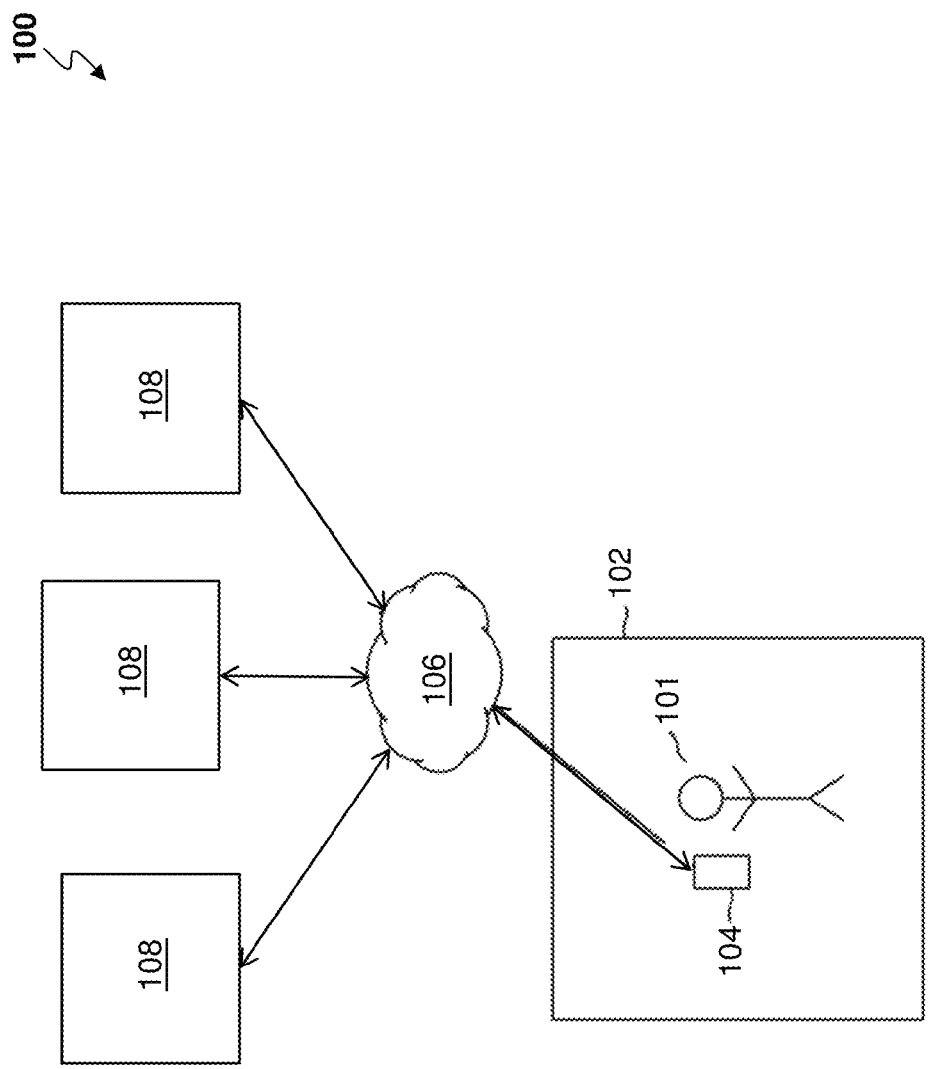
FIG. 1 is an illustration showing a user at a physical location receiving content from a content provider, according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

One embodiment of the present disclosure involves a system. The system includes a display interface operable to receive an input from a user and communicate an output to the user, a transceiver operable to electronically communicate with a content provider, a computer processor operable to execute instructions, and a memory storage operable to store the instructions. The memory storage further comprising a program module that is operable to: submit a search request regarding a specific item at the content provider; receive search data regarding the specific item from the content provider; display a virtual reality street view on the display interface, the virtual reality street view having the search data regarding the specific item overlaid thereon; and navigate through the virtual reality street view by performing navigation functions.

Another embodiment of the present disclosure involves a method. The method includes interacting with a provider of digital content to request data regarding a specific item of interest using a mobile device associated with a user, receiving the requested data regarding the specific item of interest from the provider of digital content on the mobile device, rendering the received data regarding the specific item of interest on a display of the mobile device, the rendering including superimposing the received data on a street view, and navigating through the street view according to navigation functions of the mobile device to locate a physical commercial location that carries the specific item of interest.

Another embodiment of the present disclosure involves an electronic device. The electronic device includes a non-transitory, tangible computer readable storage medium storing a computer program. The computer program contains instructions that when executed perform: receiving data representative of a specific item, the data representative of a specific item received at the mobile device, which is associated with a user; based on the received data representative of the specific item, submitting a search request at a content provider to determine a physical commercial location that carries the specific item; receiving search data regarding the specific item from the content provider, the received search data regarding the specific item including data regarding a physical commercial location that carries the specific item; overlaying the search data regarding the specific item on a street view on the display of the mobile device; and navigating through the street view according to navigation functions of the mobile device.

As the Internet continues to evolve, users become accustomed to receiving media on-line and on their mobile devices. Modern day mobile electronic devices are often equipped with cameras, Global Positioning System (GPS) transceivers, and various kinds of sensors such as accelerometers, proximity sensors, ambient light sensors, compasses, gyroscopes, etc. These features, along with the communication and computing capabilities, make the portable electronic devices very versatile and powerful. Unfortunately, the potential of these devices have not been fully realized in a physical commercial setting (e.g., brick-and-mortar retail context). For example, the various capabilities of the portable electronic devices have not been utilized to provide a more convenient shopping experience for users of these electronic devices, nor have these capabilities been sufficiently explored to optimize a brick-and-mortar retailer's reach of customers.

According to the various aspects of the present disclosure, a method and apparatus are discussed below that take advantage of the various capabilities of the portable electronic devices to offer benefits to both a user and a brick-and-mortar retailer. For instance, one embodiment includes methods whereby a user of a mobile device uses the mobile device to search for a specific item. After the specific item has been found, the mobile device renders a map and/or a street view of a virtual or an augmented reality with an overlay of the physical location of the retailers that have that specific item. The user, thereafter, may use the mobile device to navigate through the street view of the virtual or the augmented reality to identify a desirable brick-and-mortar retailer that has that specific item. Another instance includes embodiments such as a provider-side and a user side applications and devices to provide and receive, respectively, the digital data including specific item data, map and/or street view data, and overlay data which the mobile device can merges to thereby allow the user to navigate and identify a desirable brick-and-mortar retailer that has that specific item.

Thus, various embodiments combine the digital realm with the physical realm. A user seeking to participate in a brick-and-mortar channel of commerce receives digital content on a mobile device and, thus, also participates in an on-line, mobile channel of commerce.

FIG. 1 represents an illustration of a system 100 according to various aspects of the present disclosure. In FIG. 1, a user 101 is at physical location 102 and has mobile device 104. The mobile device 104 has access to a network 106 which is used to communicate with one or more on-line content providers 108. The on-line content providers 108 provide digital data to the mobile device 104 of the user 101 via network 106, according to embodiments described further below.

Physical location 102 may be a static physical location (i.e., the user 101/mobile device 104 are not moving) or a dynamic physical location (i.e., the user 101/mobile device 104 are moving). In this example, physical location 102 is initially a static physical location such as coffee house, a hotel lobby, etc. As will be readily apparent from the disclosure below, in various embodiments, the physical location may change dynamically after a period of time. In the present example, the mobile device 104 has a network connection at the physical location 102, according to various network connection methods discussed below.

Mobile device 104 may include any type of mobile device configured to access digital data over a network. Examples include a notebook/laptop computer, a tablet computer (such as an iPad™ tablet computer), an MP3 player (such as an iPod™ music player), a e-book reader (such as the Kindle™ reader), a smartphone (such as the iPhone™ phone) and/or the like. Mobile device 104 includes at least one network connection operable to communicate with at least one content provider 108 over network 106. Examples of network connections include 3G/4G/LTE cellular wireless connections, 802.11 (Wi-Fi) connections to a LAN, WAN, or the Internet, a wired connection (such as by Ethernet), and/or the like. As discussed above, mobile device 104 may be equipped with cameras, Global Positioning System (GPS) transceivers, and various kinds of sensors such as accelerometers, proximity sensors, ambient light sensors, compasses, gyroscopes, etc. The mobile device 104 may further include programs and/or applications stored on computer readable medium that utilizes the above disclosed equipment for input/output (I/O) of data and to determine the physical location 102 of the user 101 and the mobile device 104.

User 101 may access content provided by on-line content provider 108 by, e.g., accessing content of content provider 108 through a web browser or a specialized application on mobile device 104. For example, user 101 may be seeking to purchase a specific item at a brick-and-mortar retailer nearby. Using the mobile device 104, the user 101 may gain access to the network 106 and thereafter direct a web browser of the mobile device 104 to a content provider 108 website. The content provider 108 may be any content provider such as Google, Yahoo, MSN, MILO, etc. . . . . Once at the content provider 108 web site, the user 101 submits a search request for the specific item sought. In response to the search request, the content provider 108 provides search result data regarding the specific item to the mobile device 104 via network 106. In alternative embodiments, rather than directing a web browser, the user 101 utilizes the application executing on the mobile device 104 to submit the search request to the content provider 108, which in response provides search result data regarding the specific item to the user's 101 mobile device 104 via network 106.

The user 101 may also utilize other means of searching for the specific item. In one embodiment, other means of searching for the specific item include scanning a code representative of the item searched by executing a program or an application that uses the camera of the mobile device 104. Codes representative of the item searched may include a UPC code, an EAN code, a QU code, or any other appropriate code. The scanning may be performed using the mobile device 104 executing code scanning programs and/or applications such as RedLaser®, Code Scanner®, or any appropriate code scanning programs and/or applications. Such applications may be downloaded from both Apple's® App Store and Google's® Android Market. After the code representative of the specific item searched has been scanned with the mobile device 104, the program and/or application contacts the content provider 108 over the network 106 and submits a search request for the specific item. In response, the content provider 108 returns search results data regarding the specific item to the mobile device 104 of the user via network 106.

In another embodiment, other means of searching for the specific item include visual identification of the specific item using spatial or pattern recognition. For instance, the mobile device 104 may execute a spatial or pattern recognition program and/or application, which is stored on computer readable medium of the mobile device 104. The spatial or pattern recognition program and/or application may utilize the camera of the mobile device 104 to obtain a digital image of the specific item desired by the user 101. After obtaining the digital image, the program and/or application performs spatial or pattern recognition to identify the specific item and contacts the content provider 108 over the network 106 and submits a search request for the specific item. In response, the content provider 108 returns search results data regarding the specific item to the mobile device 104 of the user via network 106. In alternative embodiments, the program and/or application submits that digital image to the content provider 108, which performs spatial or pattern recognition to identify the specific item and thereafter returns search results data regarding the specific item to the mobile device 104 of the user via network 106.

In some instances, content provider 108 downloads the search results data to the mobile device 104, whereas in other embodiments, content provider 108 streams the search results data to the mobile device 104. The search results data, provided by the content provider 108 to the user's 101 mobile device 104, may include data regarding the location/address of brick-and-mortar retailers that have the specific item in inventory, contact information of retailers, number of items in inventory, size in inventory, price of item, product names, ratings of the product, etc. The location of the brick-and-mortar retailer, provided in the search results, may be based on the location of the user 101 and the mobile device 104. In other words, the content provider 108 may limit the search results to brick-and-mortar retailers near the user 101/mobile device 104. As explained further below, there are various techniques for determining a user's location, and the various embodiments may use any such technique now known or later developed. The user 101 may utilize the provided search results to navigate through a virtual/augmented reality street view in order to locate a nearby brick-and-mortar retailer that has the specific item in inventory, as will be readily apparent from the disclosure set forth below.

It is a feature of various embodiments to make digital data available to a user based on the user's specific physical location. In one embodiment, a program and/or application on mobile device 104 and/or a program running on a computer at physical location 102 or content provider 108 verifies the location of user 101. In an example wherein mobile device 104 is enabled to the Global Positioning System (GPS) or other satellite-based location service, a GPS receiver built into mobile device 104 discerns the location of the mobile device 104. Through a computer processor, a program and/or application on mobile device 104 and/or a program at content provider 108 analyzes location information received from the GPS receiver and makes a determination of the location of the user 101/mobile device 104 to provide location based search results.

In a different embodiment, mobile device 104 communicates with cell towers nearby (for example through a cellular band or mode). The cell towers can be used to triangulate the position based on communication with the mobile device 104 of the user 101. In that manner, the content provider 108 may ascertain the physical location and provide location based search results.

In yet another embodiment, mobile device 104 is configured to connect to a network at the physical location 102, so that mobile device 104 is assigned an Internet Protocol (IP) address. The IP address may be received and analyzed by an application on mobile device 104 and/or by the content provider 108. In response to the results of the analysis, content provider 108 may ascertain the physical location of the user 101 and the mobile device 104 and provide location based search results. In still another embodiment, user 101 enters a physical location within the mobile device 104 which is used by the content provider 108 to provide location based search results. Any technique now known or later developed to discern the physical location of the user 101 and the mobile device 104 may be adapted for use in various embodiments.

Upon receiving the search result data regarding the specific item, in one embodiment, the user 101 utilizes a mapping program and/or application to locate nearby brick-and-mortar retailers that have the specific item in inventory. For instance, the search result data may be rendered in a map view that shows a topical area such as streets, the user 101 location, and the location of the brick-and-mortar retailers that have the specific item in stock. The mapping program and/or application may be stored in whole or in part on computer readable medium of the mobile device 104 of the user 101, and/or may be downloaded or streamed to the mobile device 104 from the content provider 108. The content provider 108 that has provided the search results data may be the same or different from the content provider that provides the mapping data. For instance, the content provider that provides the search results data may be MILO and the content provider that provides the mapping data may be Google. As another example, Google may provide both the search results data and the mapping data to the mobile device 104 of the user 101.

Figure 2:
FIG. 2 is an illustration of a mobile device, according to various aspects of the present disclosure.

Referring to FIG. 2, after viewing the map rendering, the user may decide to switch to a street view 200 and navigate through a virtual reality that displays images of the street at or near the user's 101 current physical location 102. As will be evident from the discussion below, navigating through the virtual reality street view may be performed in a static and/or in a dynamic mode. As illustrated in FIG. 2, the street view includes an overlay of brick-and-mortar stores 202 that have the specific item in stock (e.g., Maud's Fashion, Jackie's Fashion, etc. . . . ). Additional information, which was provided in the search results, may be presented to the user, while in street view. In the illustrated embodiment, for example, the number of items in stock (e.g., Viesal Jacket (3) in stock) is displayed. Further, the user may select a button 204 related to the brick-and-mortar retailer 202 to view additional information related to the specific item and/or the retailer 202. Additional information may be information such as retailer contact information (e.g., phone number/website/email), size in inventory, price of item, product names, ratings of the product, etc. As illustrated, a portion of the street view display may be configured to provide user instructions (e.g., Tilt phone to navigate, etc. . . . ).

FIG. 3A illustrates a schematic side view of the mobile device 104 according to various aspects of the present disclosure and FIG. 3B illustrates a schematic top view of the mobile device 104 according to various aspects of the present disclosure. Referring to FIG. 3A, while in the street view, the user may navigate through the street view longitudinally according to various methods. For instance, the user may navigate forward through the street view by tilting the mobile device 104 in a forward motion 302 to angle θ1, about the x-axis. Further, the user may navigate backward through the street view by tilting the mobile device 104 in a backward motion 304 to angle θ2, about the x-axis. In certain embodiments, by tilting the mobile device 104 to a greater angle about the x-axis from a fixed angle position (e.g., zero angle position), navigating through the street view will occur at a faster pace. Conversely, by tilting the mobile device 104 by a lesser angle from the fixed angle position about the x-axis, navigation through the street view will occur at a slower pace. In certain examples, there is a hysteresis where a small angle change from the fixed angle position does not affect navigation. In further examples, the speed that the mobile device 104 has been tilted about the x-axis affects the pace of navigation through the street view. In still further examples, the duration that the mobile device 104 is tilted about the x-axis affects the pace of navigation through the street view.

As such, the rate or pace of forward/backward movement through the street view may be a function of the angle of tilt, speed of tilt, duration of tilt, or a combination of these factors. The tilt angle may range from about a positive 90 degrees (for forward movement) to about a negative 90 degrees (for backward movement). In the illustrated embodiment, the angle ranges from about a positive 45 degrees (for forward movement θ1) to about a negative 45 degrees (for backward movement θ2). The tilt angle, tilt speed, and tilt duration may be determined by utilizing gyroscope and clock hardware of the mobile device 104 and various programs and/or applications installed on computer readable medium and executed on the mobile device 104.

Referring to FIG. 3B, while in the street view, the user may navigate through the virtual reality angularly according to various methods. For instance, the user may turn right through the street view by rotating the mobile device 104 toward the right 306 to angle θ3, about the y-axis. Further, the user may turn left through the street view by rotating the mobile device 104 toward the left 308 to angel θ4, about the y-axis. In further embodiments, by rotating the mobile device 104 to a greater rotation angle from the fixed angle position (e.g., zero angle position) about the y-axis, turning through the street view will occur at a faster pace. Conversely, by rotating the mobile device 104 by a lesser rotation angle from the fixed angle position about the y-axis, turning through the street view will occur at a slower pace. In certain examples, there is a hysteresis where a small angle change from the fixed angle position does not affect navigation. In further examples, the speed that the mobile device 104 has been rotated affects the rate of turning through the street view. In still further examples, the duration that the mobile device 104 is rotated affects the rate of turning through the street view.

As such, the rate of turning through the street view may be a function of the angle of rotation, speed of rotation, duration of rotation, or a combination of these factors. The rotation angle may range from about a positive 90 degrees (for right turns) to about a negative 90 degrees (for left turns). In the illustrated embodiment, the angle ranges from about a positive 45 degrees (for right turns θ3) to about a negative 45 degrees (for left turns θ4). The rotation angle, rotation speed, and rotation duration may be determined by utilizing compass and clock hardware of the mobile device 104 and various programs and/or applications installed on computer readable medium and executed on the mobile device 104.

Referring back to FIG. 2, in further embodiments, the user may navigate through the virtual reality street view by activating hard or soft buttons for forward movement, backward movement, left turns, and right turns. For instance, as illustrated in FIG. 2, soft buttons which are illustrated as arrow keys 206 are provided on the display that activated by a user, e.g., by pressing, in order to navigate through the virtual reality street view. The arrow keys 206 point forward, backward, left, and right for navigation through the street view. In some embodiments, buttons that have another form (e.g., triangular, round, oval, square, rectangular, etc. . . . ) are located at substantial similar locations and perform substantially similar functions as the arrow keys.

In still further embodiments, the user may navigate through the virtual reality street view by utilizing sliding motions on the display. For instance, the mobile device 104 may be configured such that a vertical sliding motion (e.g., from the bottom toward the top of the display) provides forward motion, another vertical sliding motion (e.g., from the top toward the bottom of the display) provides backward motion, a longitudinal sliding motion (e.g., from the left toward the right of the display) provides right turns, and another longitudinal sliding motion (e.g., from the right toward the left of the display) provides left turns. The sliding motions may be reversed if it is desirable such that a sliding motion from the bottom toward the top provides backward motion, a sliding motion from the top toward the bottom provides forward motion, a sliding motion from the left toward the right provides left turns, and a sliding motion from the right toward the left provides right turns.

In yet still further embodiments, a two-finger expand motion is utilized for forward movement and a two-finger pinch motion is utilized for backward movement. It is understood that each of the above described navigation methods are independent and may be enabled and/or utilized separately or together via software/hardware methods. For example, the tilting/rotation functions may be utilized separately without the sliding functions being enabled. Alternatively, for example, the tilting/rotation functions may be utilized along with the sliding functions to provide additional means for navigation.

Referring back to FIG. 1, utilizing the provided search result data overlaid on the map/street view, the user 101 can navigate through a virtual reality street view (utilizing various methods described above) to search for desirable brick-and-mortar retailers located near the user's 101 current physical location 102. Once the user 101 has located one or more brick-and-mortar retailers that have the specific item in stock at a desirable location, price, size, etc. . . . , the user may elect to leave the current physical location 102 to purchase the specific item from the identified brick-and-mortar retailer.

Should the user 101 leave physical location 102, a dynamic mode will be entered where the mobile device 104 utilizes cellular band and modes such as 3G, 4G, LTE, or any other appropriate technique now known or later developed that allows for providing content while the user 101 and the mobile device 104 are in a transient state. While in dynamic mode, the mobile device 104 may continue to operate as previously described, or may operate in a dynamic navigation mode, depending on user selected preferences of the application and/or program. For example, where the mobile device 104 continues to operate as previously described according to selected preferences, the street view will not be updated unless the user 101 performs navigation functions as described above. On the other hand, where the mobile device 104 operates in dynamic mode according to selected preferences, the mobile device 104 will utilize physical positioning methods (as described above) to determine and update the user 101 and the mobile device 104 positions and thereafter update the navigation street view accordingly. As such, when operating in dynamic mode, the street view on the display of the mobile device 104 is continuously or periodically updated so that the street view represents the current position of the user 101. It is understood that while operating in dynamic mode, the user may still perform static mode functions for navigation through the street view, after which the street view will revert back to dynamic mode. Reverting back to dynamic mode may be initiated by the user or may be performed automatically (e.g., a timer expires since the user 101 has performed navigation functions).

In alternative embodiments, rather than utilizing map street view data from the content provider 108, the mobile device 104 operates in an augmented reality mode that has an overlay of the search results regarding the specific item. For example, after a search for the specific item has been performed and the search results data from the content provider 108 has been received by the mobile device 108, the user 101 may initiate an augmented reality mode by utilizing a program and/or application stored on the mobile device 104. The augmented reality program and/or application utilizes the camera of the mobile device 104 to render a current street view (e.g., as the user 101 is walking down the street). The current street view is overlaid in real-time with the search results data regarding the specific item, in a manner substantially the same as that described above with regards to the virtual reality street view that is map based. The augmented reality street view (including the overlay) is navigated/updated in real-time as the image from the camera of the mobile device 104 changes (e.g., as the user 101 continues to walk down the street). As such, a real-time augmented reality street view, having an overlay of the search results data regarding the specific item, is provided on the display of the mobile device 104.

The various embodiments described above provide one or more advantages. For instance, the user utilizing the above described mobile device will experience a more efficient shopping experience as only the brick-and-mortar retailers that have the specific item in stock will be considered and visited, thereby saving considerable time. Further, the user will be able to determine the retailer that has the best price for a specific item. On the other hand, the brick-and-mortar retailer may benefit by increasing its exposure to customers that would have been on-line shoppers, thereby driving more customers to its brick-and-mortar retail locations. Furthermore, the retailer may receive additional traffic within the store, thereby increasing the probability of additional transactions that may result from impulse buys.

Figure 4A:
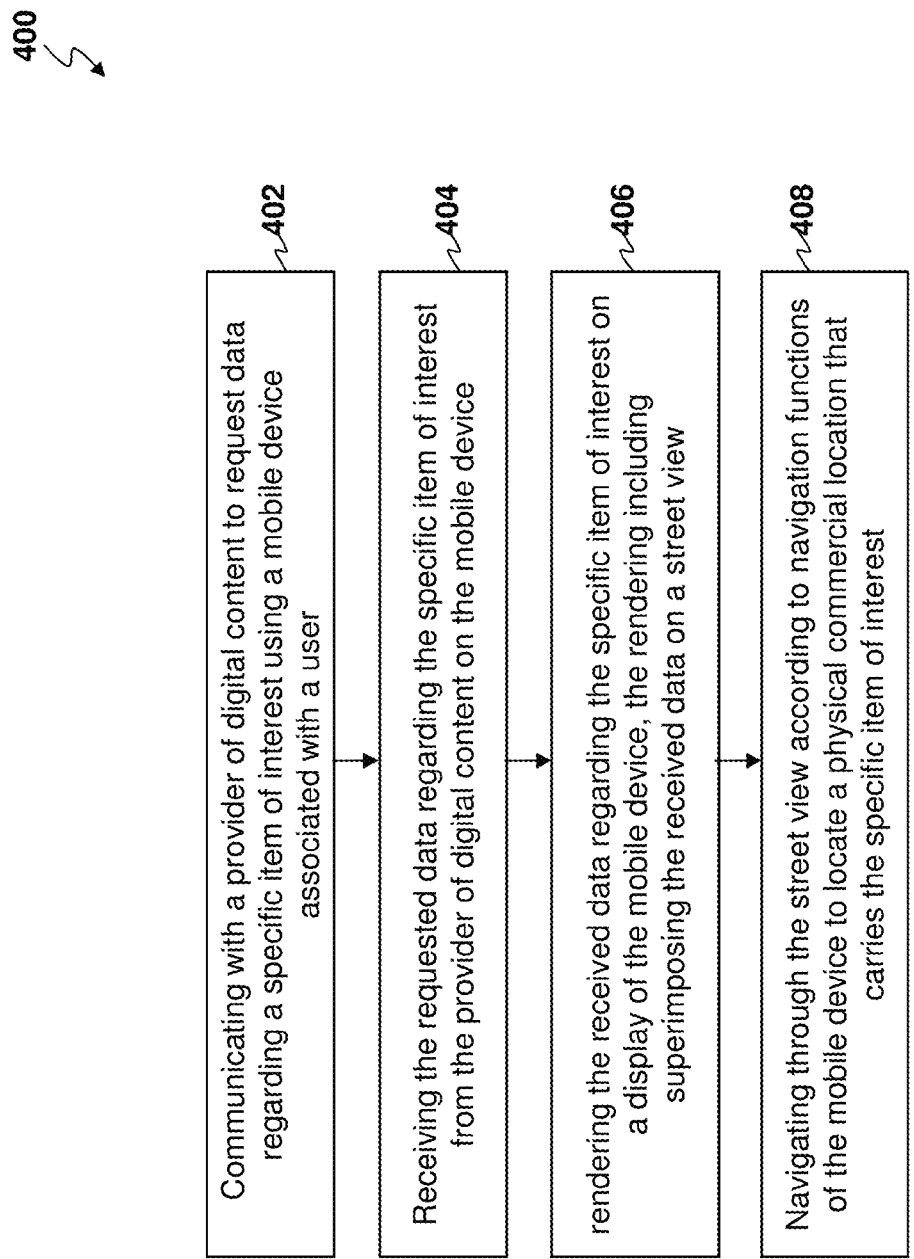
FIG. 4A is an illustration of an example method, according to various aspects of the present disclosure.

FIG. 4A is an illustration of process 400 according to one embodiment. Process 400 may be performed, for example, by a human user and/or a mobile device of the user.

At block 402, communication occurs with a provider of digital content to request data regarding a specific item of interest on a mobile device associated with a user of the mobile device. The communication is between the user and/or the user's mobile device and the content provider. Such communicating may include providing an interface to the user and/or sending messages between the user's mobile device and the content provider to access the data of the content provider over a network. The content provider may be, for example, an on-line content provider, as discussed above. The content provider may return search results based on the user/mobile device physical location, which may be determined according the methods discussed above.

At block 404, the requested data regarding the specific item of interest is received from the provider of digital content on the mobile device. Receiving the requested data may include downloading the requested data to the mobile device and/or streaming the requested data to the mobile device.

At block 406, the received data regarding the specific item of interest is rendered on a display of the mobile device. The rendering includes superimposing the received data on a street view. The street view is based at least in part on a physical location received from an interaction with the user.

At block 408, the street view is navigated according to navigation functions of the mobile device. The navigation may be performed to determine a physical commercial location that has the specific item of interest. The user may perform the navigation functions with the mobile device as described above with reference to FIGS. 2-3.

Various embodiments include an application running on a user's mobile device that allows the user to perform the methods described above. For instance, an application may include computer-readable code running on one or more processors at the user's mobile device. The processor executes the code to perform the actions described below. FIG. 4B is an illustration of exemplary process 450, adapted according to one embodiment, which may be performed by an application on a user's mobile device.

At block 452, data representative of a specific item is received. The data representative of the specific item is received at the mobile device of a user. For instance, the user may provide the data representative of the specific item by manually inputting a search string, scanning a code, providing a digital image, or providing other data representative of the specific item. Furthermore, the application may provide an interface to apprise the user that the data representative of a specific item has been received and to interact with a content provider and/or other third parties.

At block 454, based on the received data representative of the specific item, a search request is submitted at a content provider to determine physical commercial locations that carry the specific item. Submitting the search request at the content provider may include establishing a network connection and transferring data to the content provider to initiate the search. The content provider may be, for example, an on-line content provider, as discussed above.

At block 456, search data regarding the specific item is received from the content provider. The received search data includes data regarding a physical commercial location that carries the specific item. The physical commercial location may carry the specific item in stock or may carry the specific item by providing special ordering. The content provider may provide search results based on the user/mobile device physical location, which may be determined according the methods discussed above.

At block 458, the search data regarding the specific item is overlaid on a street view on the display of the mobile device. Overlaying the search data regarding the specific item may include providing the name of one or more physical commercial locations, the number of items in stock, price per item, size in stock, etc., as described above.

At block 460, the street view is navigated by performing navigation functions. The user may perform the navigation functions with the mobile device as described above with reference to FIGS. 2-3.

It is understood that the processes 400 and 450 may include additional steps that may be performed before, during, or after actions described above. For example, before the access to the network and/or content provider is granted to the user, the user may be required to enter a correct combination of a username and a password. In some instances, the user is prompted to become a member, if the user is not already a member.

Figure 5:
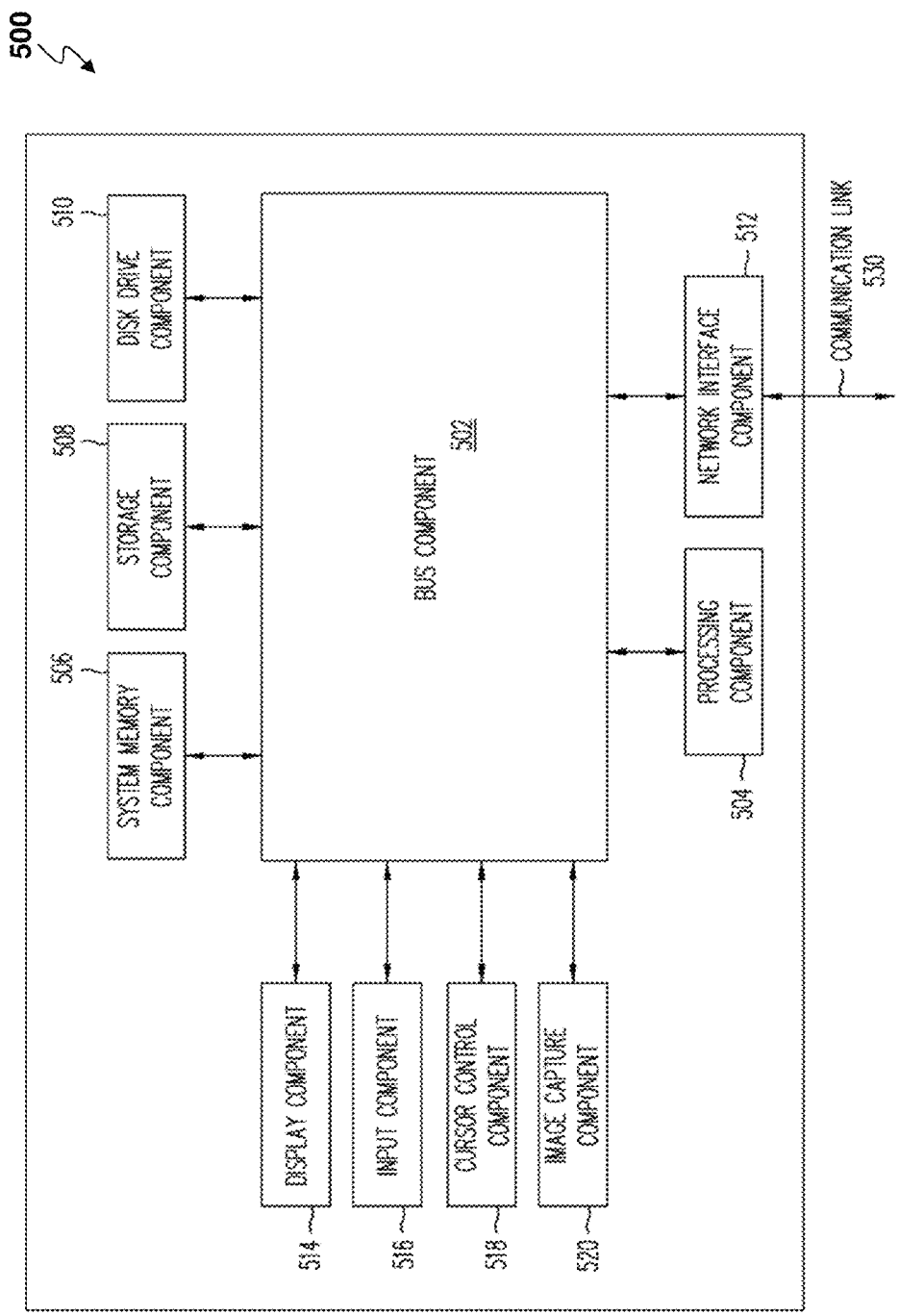
FIG. 5 is a block diagram of an example computer system suitable for implementing various methods and devices described, according to various aspects of the present disclosure.

FIG. 5 is a block diagram of an example computer system 500 suitable for implementing various methods and devices described herein, for example, the various method blocks of the method 400 and 450. In various implementations, user devices may comprise a network communications device (e.g., mobile cellular phone, laptop, personal computer, tablet, etc.) capable of communicating with a network, and a content provider device may comprise a network computing device (e.g., a network server, a computer processor, an electronic communications interface, etc). Accordingly, it should be appreciated that each of the devices may be implemented as the computer system 500 for communication with the network in a manner as follows.

In accordance with various embodiments of the present disclosure, the computer system 500, such as a mobile communications device and/or a network server, includes a bus component 502 or other communication mechanisms for communicating information, which interconnects subsystems and components, such as processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise an array having one or more disk drive components.

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure.

Logic may be encoded in a computer readable medium, which may refer to any medium that participates in providing instructions to processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other non-transitory medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a display interface operable to receive an input from a user and communicate an output to the user;
a transceiver operable to electronically communicate with a content provider;
a computer processor operable to execute instructions; and
a memory storage operable to store the instructions, the memory storage further comprising a physical location module operable to discern a physical location of the user and a program module that is operable when executed by the processor to:
submit a search request regarding a specific item of personal property at the content provider;
receive search data regarding the specific item of personal property from the content provider;
display a first person perspective street view on the display interface, the street view having the search data regarding the specific item of personal property overlaid thereon with the search data being sized on the display interface in proportion to a proximity to the physical location of the user, the search data identifying a physical commercial location, a size of the specific item of personal property, and a number representative of inventory of the specific item of personal property at the physical commercial location;
provide a virtual reality static mode navigation display configured to update the first person perspective street view in response to navigation functions entered by the user, thereby simulating the user walking along a street; and
switch to an augmented reality dynamic mode navigation display based on a detection of a change of physical location of the user by the physical location module, the augmented reality dynamic mode navigation display at least periodically updating the street view with the overlaid search data based on the discerned physical location of the user.

2. The system of claim 1, wherein the program module is operable to:
limit the search request regarding the specific item of personal property based on the discerned physical location of the user.

3. The system of claim 1, wherein:
the program module is operable to receive virtual reality street view data from the content provider, and
the virtual reality street view data is utilized to display the street view on the display interface for the virtual reality static mode navigation display.

4. The system of claim 1, wherein the submitted search request regarding the specific item of personal property is based in part on data received from the user interacting with the display interface.

5. The system of claim 1, wherein the program module is further operable to:
recognize a tilting operation to indicate longitudinal movement through the street view in the virtual reality static mode navigation display; and
recognize a rotation operation to indicate angular movement through the street view in the virtual reality static mode navigation display.

6. The system of claim 5, wherein:
the tilting operation includes utilizing a gyroscope of the system, and
the rotation operation includes utilizing a compass of the system.

7. The system of claim 1, wherein the program module is further operable to:
recognize that a first gesture has been performed on the display interface in the virtual reality static mode navigation display to indicate longitudinal movement through the street view; and
recognize that a second gesture has been performed on the display interface in the virtual reality static mode navigation display to indicate angular movement through the street view.

8. The system of claim 7, wherein:
the first gesture includes a vertical sliding motion across the display interface, and
the second gesture includes a longitudinal sliding motion across the display interface.

9. The system of claim 7, wherein:
the first gesture includes activating buttons positioned toward top and bottom edges of the display interface, and
the second gesture includes activating buttons positioned toward left and right edges of the display interface.

10. The system of claim 1, wherein the program module is further operable to:
revert from the augmented reality dynamic mode navigation display to the virtual reality static mode navigation display in response to entry of a gesture input by the user during the augmented reality dynamic mode navigation display.

11. The system of claim 10, wherein the program module is further operable to:
revert from the virtual reality static mode navigation display to the augmented reality dynamic mode navigation display in response to expiration of a timeout period triggered by the gesture input.

12. A method comprising:
communicating with a provider of digital content to request data regarding a specific item of personal property using a mobile device associated with a user;
receiving the requested data regarding the specific item of personal property from the provider of digital content on the mobile device;
rendering the received data regarding the specific item of personal property on a display of the mobile device, the rendering including superimposing the received data on a first person perspective street view, the received data identifying a physical commercial location viewable from the street view that carries the specific item of personal property and a number representative of inventory of the specific item of personal property at the physical commercial location;
navigating, by the mobile device, through the first person perspective street view in a virtual reality static mode navigation display in response to one or more navigation functions entered by the user, thereby simulating the user walking along a street;
switching, by the mobile device, from the virtual reality static mode navigation display to an augmented reality dynamic mode navigation display based on a detection of a change of the physical location of the user; and
navigating, by the mobile device, through the first person perspective street view in the augmented reality dynamic mode navigation display as the user walks along a street,
wherein the navigating includes continually or periodically updating, by the mobile device, the street view including the superimposed received data regarding the specific item of personal property as the user walks along the street, the superimposed received data being added by the mobile device in response to at least a portion of the corresponding physical commercial location becoming viewable within the street view or removed by the mobile device in response to substantially all of the corresponding physical commercial location becoming no longer viewable within the street view.

13. The method of claim 12 wherein receiving the requested data regarding the specific item of personal property includes at least one of:
downloading the requested data to the mobile device; and
streaming the requested data to the mobile device.

14. The method of claim 12, wherein superimposing the received data on the first person perspective street view includes providing on the display a user selectable button for viewing additional information related to the specific item of personal property at the physical commercial location, the additional information including a size of the specific item of personal property.

15. The method of claim 14, wherein the additional information further includes a product name of the specific item of personal property.

16. The method of claim 12, wherein the rendering includes superimposing on a top portion of the street view user instructions.

17. The method of claim 12, further comprising:
reverting from the augmented reality dynamic mode navigation display to the virtual reality static mode navigation display in response to entry of a gesture input by the user during the augmented reality dynamic mode navigation display; and
reverting from the virtual reality static mode navigation display to the augmented reality dynamic mode navigation display in response to expiration of a timeout period triggered by the gesture input.

18. A mobile device comprising a non-transitory, tangible computer readable storage medium having stored thereon computer-readable instructions executable to cause the mobile device to perform operations comprising:
submitting a search request at a content provider to determine a physical commercial location that carries a specific item of personal property;
receiving search data regarding the specific item of personal property from the content provider, the received search data regarding the specific item of personal property including data regarding a physical commercial location that carries the specific item of personal property;
overlaying the search data regarding the specific item of personal property on a street view providing a first person perspective on the display of the mobile device, the search data overlaid on the street view including a number and a size in inventory of the specific item of personal property at the physical commercial location;

navigating through the street view from the first person perspective in a virtual reality static mode navigation display in response to one or more navigation functions entered by a user of the mobile device, thereby simulating the user walking along a street;

switching from the virtual reality static mode navigation display to an augmented reality dynamic mode navigation display based on a detection of a change of physical location of the user; and navigating through the street view from the first person perspective in the augmented reality dynamic mode navigation display as the user moves with the mobile device, including continually or periodically updating the street view based on the physical location of the user and adding the overlaid search data in response to at least a portion of the physical commercial location becoming viewable within the street view or removing the overlaid search in response to substantially all of the physical commercial location becoming no longer viewable within the street view.

19. The mobile device of claim 18, wherein the mobile device comprises at least one of a laptop computer, a notebook computer, a tablet computer, and a smartphone.

20. The mobile device of claim 18, wherein:
the virtual reality static mode navigation functions include user initiated navigation functions,
the user initiated navigation functions include a tilting navigation function and a rotating navigation function,
the tilting navigation function determines longitudinal movement through the street view, and
the rotating navigation function determines angular movement through the street view.

* * * * *